INVENTORS.
Harry L. McFeaters
Ira W. Lakin
BY
THEIR ATTORNEYS

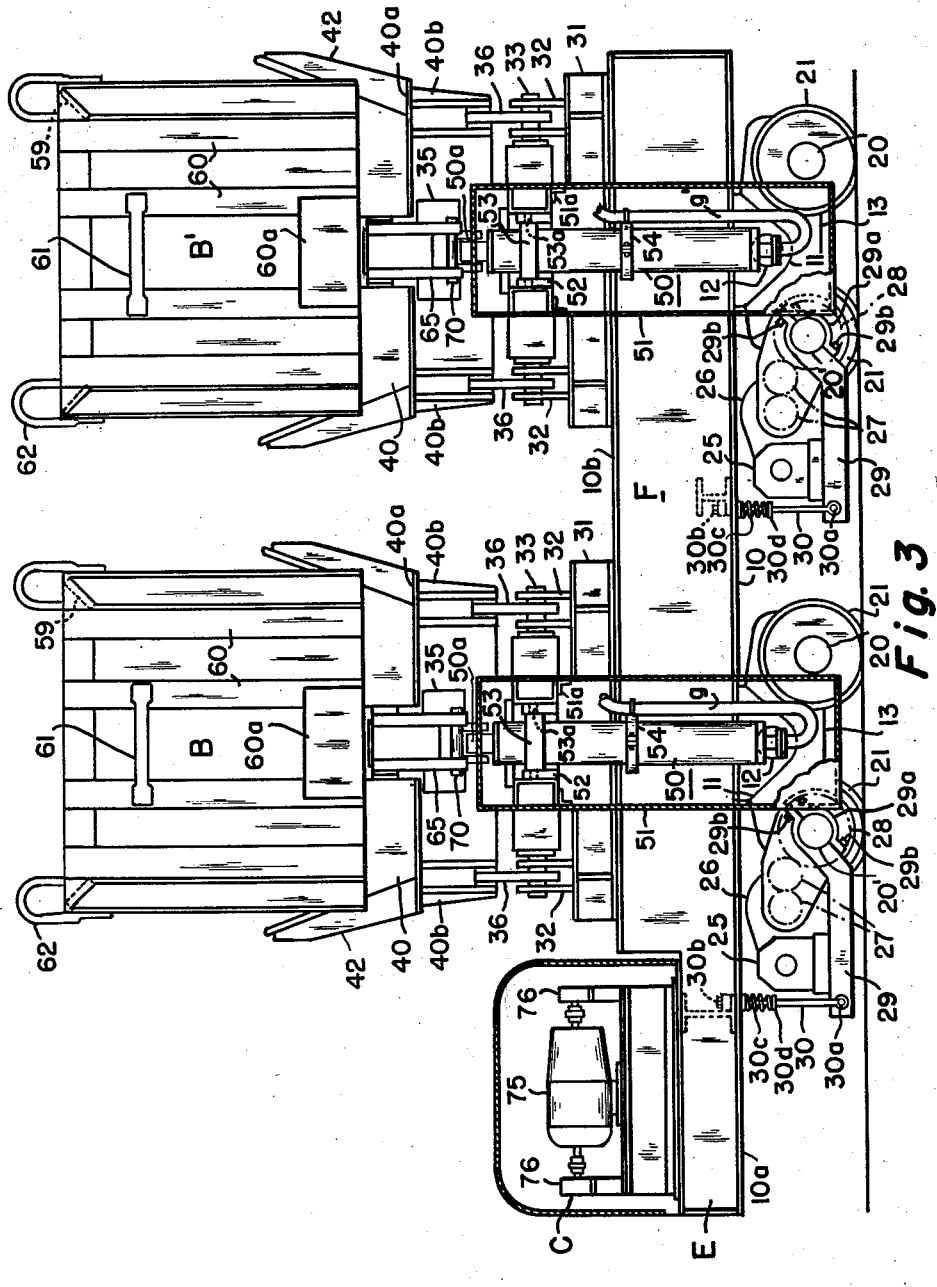

Oct. 22, 1963  H. L. McFEATERS ETAL  3,107,797
SCRAP HANDLING
Filed Dec. 2, 1960  7 Sheets-Sheet 4
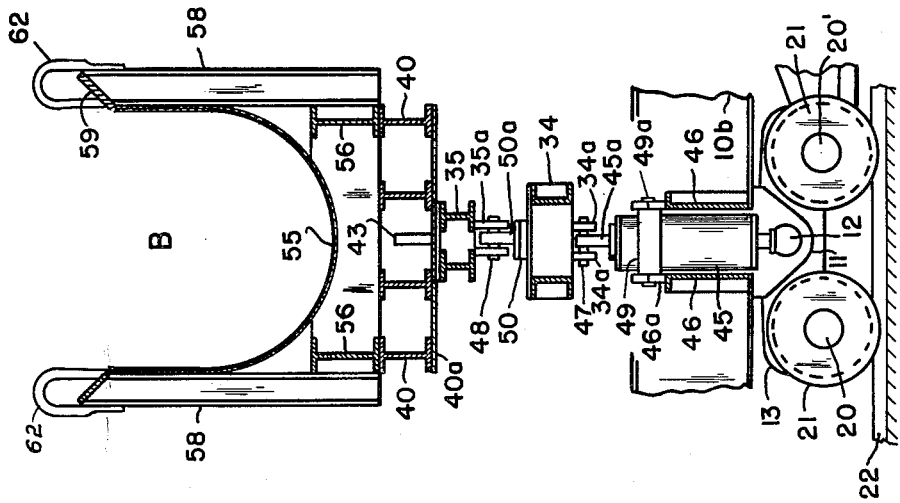
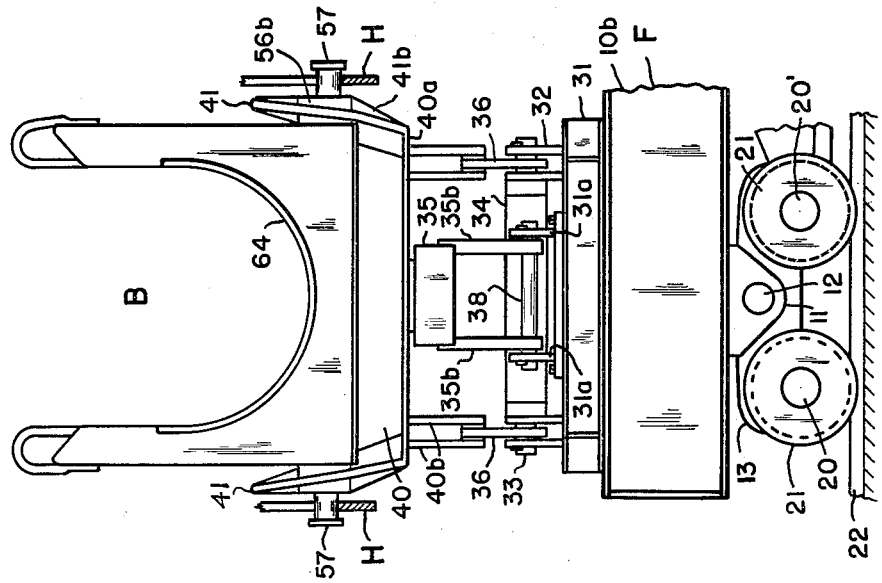
INVENTORS.
Harry L. McFeaters
Ira W. Lakin
BY
Green, McCallister & Miller
THEIR ATTORNEYS Oct. 22, 1963  H. L. McFEATERS ETAL  3,107,797
SCRAP HANDLING
Filed Dec. 2, 1960  7 Sheets—Sheet 5
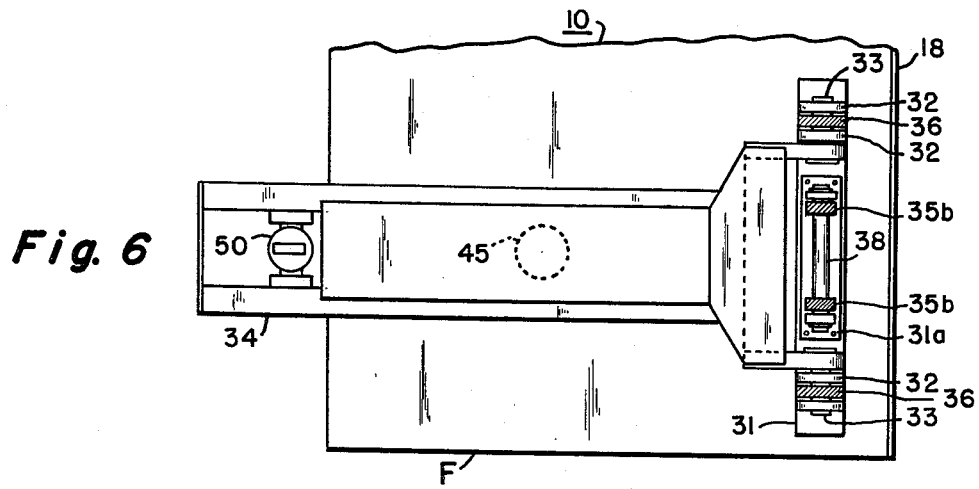
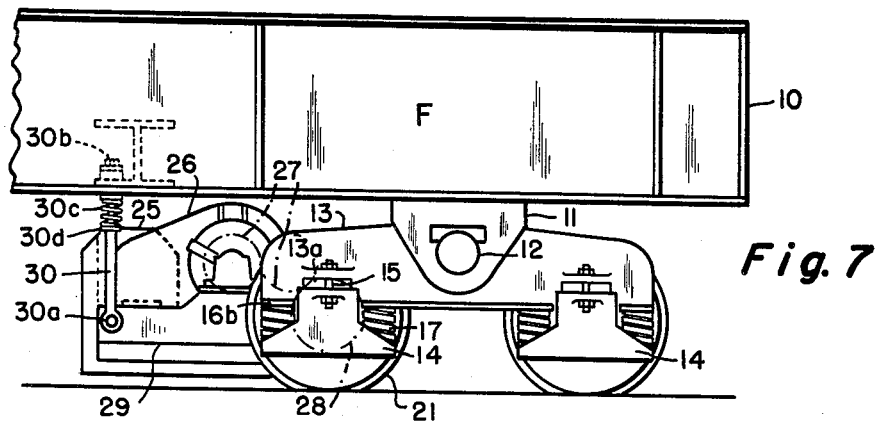
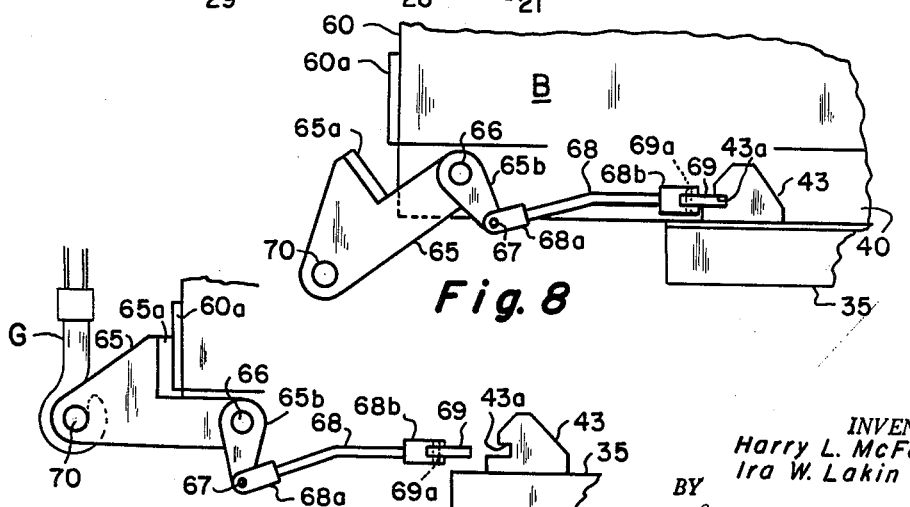
INVENTORS.
Harry L. McFeaters
Ira W. Lakin
BY
Green, McCallister & Miller
THEIR ATTORNEYS

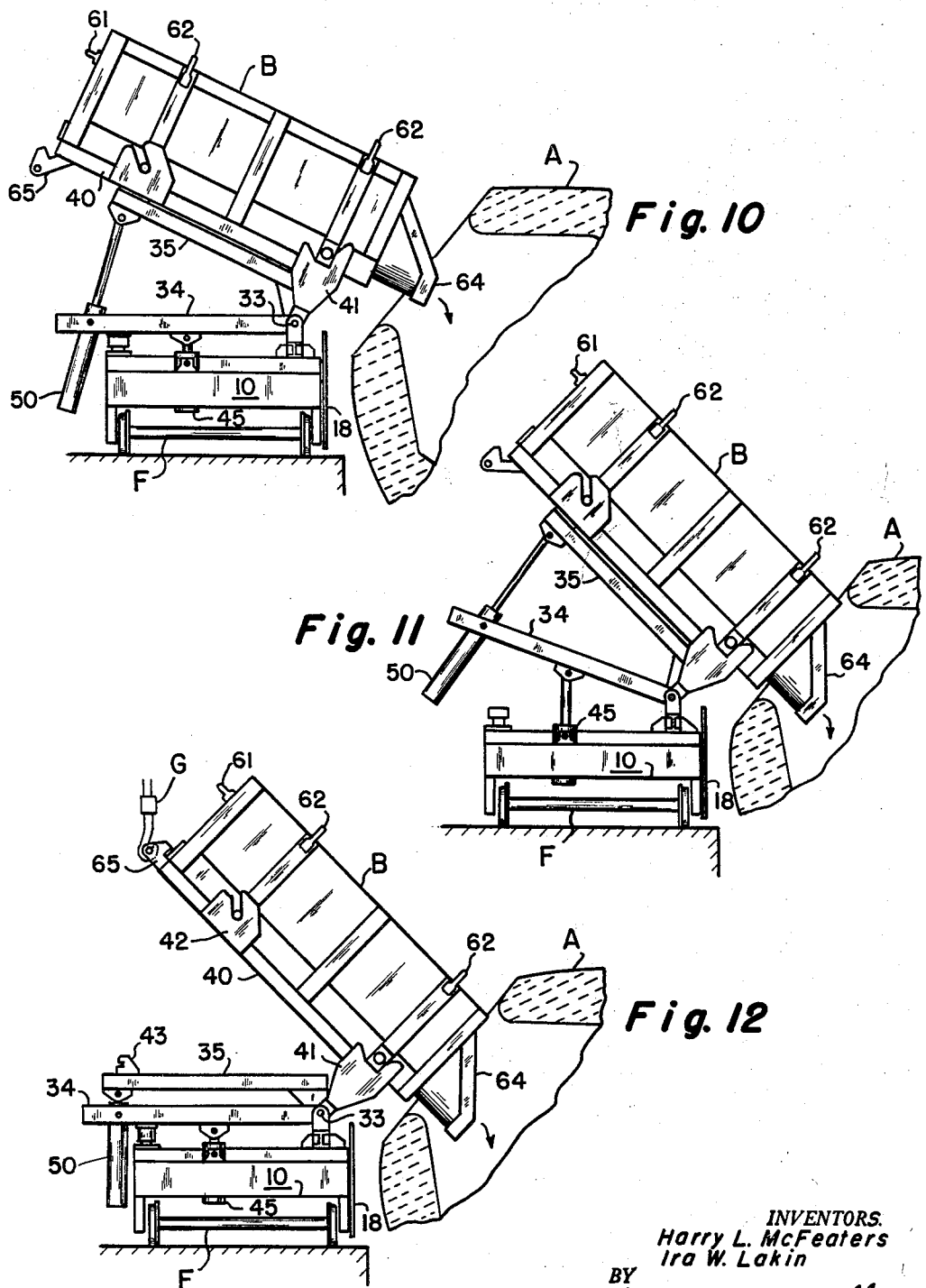

Oct. 22, 1963

H. L. McFEATERS ETAL 3,107,797

SCRAP HANDLING

Filed Dec. 2, 1960

INVENTORS.
Harry L. McFeaters
Ira W. Lakin
BY
Green, McCallister & Miller

THEIR ATTORNEYS

United States Patent Office 3,107,797
Patented Oct. 22, 1963

3,107,797
SCRAP HANDLING
Harry L. McFeaters, New Castle, and Ira W. Lakin, Volant, Pa., assignors to Pennsylvania Engineering Corporation, New Castle, Pa., a corporation of Pennsylvania
Filed Dec. 2, 1960, Ser. No. 73,325
9 Claims. (Cl. 214—18)

This invention relates to handling or feeding material such as metal scrap and particulalry, to a machine or car for carrying box means and for effectively emptying its material contents into the open mouth portion of a furnace.

A phase of the invention relates to a material handling car or machine unit for carrying scrap boxes in a balanced position thereon and which has means for selectively moving the boxes into alignment with the open mouth of a furnace vessel, such as a tiltable converter vessel employed in refining ferrous metals. Another phase deals with a car unit which carries means for removably supporting scrap box means in an aligned position thereon, which is movable to a charging station with respect to a furnace, and which is operative to selectively tiit scrap boxes for discharging their material contents into the furnace and, when a particular scrap box has been emptied, to return it to an original position.

In accordance with our invention, we have devised a scrap charging unit in the form of a self-propelled car having carriage means for positioning and supporting scrap boxes. The car is devised for flexible utilization of such boxes, either by tilting means of the unit or by employing overhead hoist means; the boxes may be lifted into and out of position with respect to the carriage means, tilted therewith or thereon. The construction is such as to permit the practical utilization of scrap boxes carried in a lateral or transverse relation with respect to the motive unit or car, in a balanced relationship thereon, and employing any suitable width or gauge of track. Although the construction is particularly suitable for furnaces that are mounted on trunnions for tiltable operation, it may be used with any furnace having an open mouth portion and particularly, one which is inclined, at least, during the charging operation. Means is provided for selectively operating each scrap box on the unit and for moving the unit, so that its scrap boxes may be progressively utilized for effecting the full charging of a furnace vessel.

It has been an object of our invention to devise a new and improved form of material handling or scrap charging apparatus for furnaces;

Another object of our invention has been to devise a flexible unit for receiving and handling scrap boxes and charging their contents into the open mouth of a furnace;

Another object of our invention has been to provide improved apparatus for positioning and tilting a scrap box and for returning the box from a tilted or charging position to a scrap-receiving and carrying position;

A further object of our invention has been to devise a car or machine unit for effectively carrying or handling the full scrap requirements of a given furnace, and which will flexibly cooperate with a plant installation in receiving scrap charges and in carrying such charges to, and quickly and effectively feed them into the furnace;

These and other objects of our invention will appear to those skilled in the art from the embodiment disclosed in the drawings, the description and the claims.

In the drawings, FIGURE 1 is a top plan view of a furnace installation employing our invention and showing a scrap charging unit with one of its scrap buckets in a transversely-aligned position with respect to a furnace vessel;

FIGURE 2 is an end view in elevation and on an enlarged scale, taken transversely of the unit of FIGURE 1; its full lines illustrate details of the construction of the unit and the substantially horizontal position of one of its scrap boxes when loaded with and carrying scrap material; its dot and dash lines illustrate the position of the scrap box in its fully or final tilted position with respect to the mouth portion of a furnace;

FIGURE 3 is a side or longitudinal view in elevation on the scale of FIGURE 2, in partial section, and taken along the line III—III of FIGURE 1;

FIGURE 4 is a fragmental side view in elevation on the scale of FIGURES 2 and 3 and taken along the line IV—IV of FIGURES 1 and 2;

FIGURE 5 is a vertical section in elevation on the scale of and taken along the line V—V of FIGURE 2;

FIGURE 6 is a horizontal section on the scale of and taken along the line VI—VI of FIGURE 2;

FIGURE 7 is an enlarged side fragment showing details of a truck mounting for the car, and drive means for actuating the car to move it along track rails;

FIGURES 8 and 9 are fragmental end views in elevation showing means for latching associated carriage frames in position with respect to each other; in this connection, FIGURE 8 shows the latching means in a locked position and FIGURE 9 shows it in an unlocked position;

FIGURES 10 and 11 are reduced end or transverse views in elevation illustrating operations in tilting a scrap or material charging box; in FIGURE 10, the box has been raised by one operating mechanism to an intermediate position and, in FIGURE 11, the box has been raised to its final position by a second mechanism;

FIGURES 12 and 13 are views on the scale of FIGURES 10 and 11 showing emergency ways of tilting scrap boxes of our invention;

Figure 14:
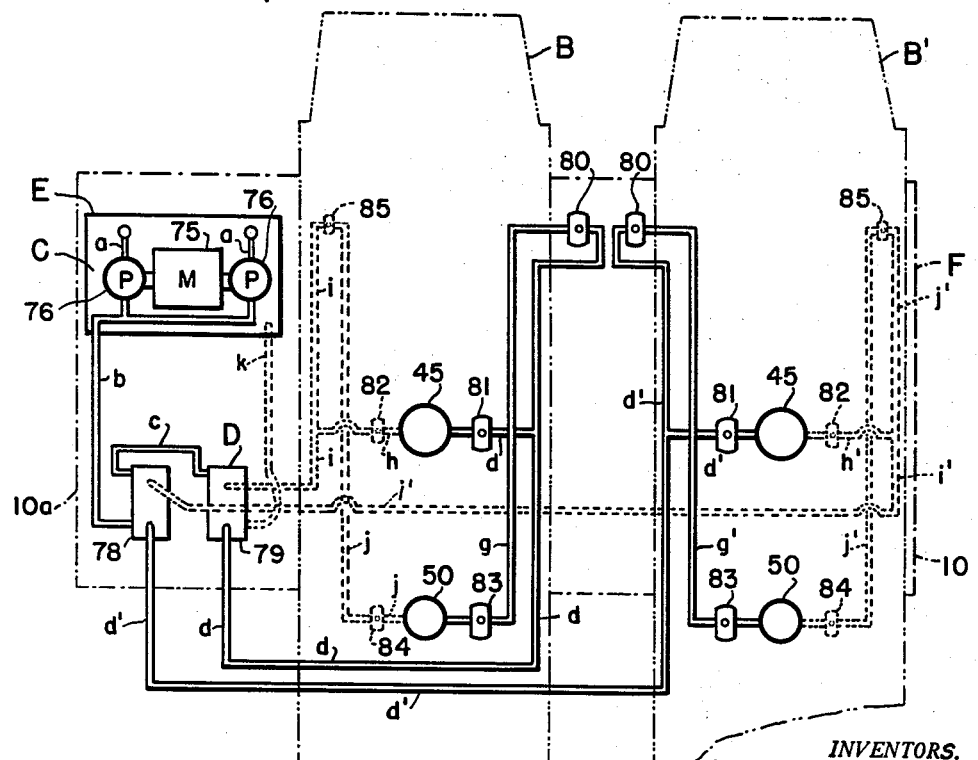

And, FIGURE 14 is a schematic plan view of a hydraulic or fluid system for operating representative tilting mechanisms shown in FIGURES 10 and 11 and, selectively, for each of a pair of scrap boxes.

It will be noted that, in accordance with our present invention, a self-propelled, scrap-charging or handling car, machine or apparatus F (see FIGURE 1) is adapted to be moved longitudinally along an overhead or elevated track 22 which runs along a vertical plane that is parallel to and behind a vertical plane running through a furnace A. The track is positioned in an elevated relation in the plant, adjacent to but below the mouth portion of the furnace. The machine or unit, as shown, has cradle means for removably carrying a pair of scrap boxes B and B' in a balanced, transversely-extending, side-by-side position thereon for movement into and out of transverse alignment with the furnace and particularly, with its open mouth portion. Normally, the scrap boxes are received and carried on a substantially horizontal plane above the car.

The car F has a similar tilt-cradle frame structure for each scrap box provided with slotted guides or wings (see FIGURE 2) to receive side-extending trunnions or mounts adjacent each end of the box, so that the box can always be moved into an exact balanced position on the cradle. The car or machine has means for separately tilting each of its cradles upwardly about a side thereof that lies adjacent or faces the furnace to effect a corresponding tilting of the scrap box carried thereby. Latching means 43 (see also FIGURES 8 and 9) is provided for securely maintaining a sub and a main cradle frame in a normally locked relationship with each other, but which is operatable to an unlocked position to permit separate tilting of the main cradle frame 40 with respect to the sub-cradle frame 35, when desired (see FIGURE 12). The frame structure has a swing frame 34 which may be actuated to effect a final, accelerated, maximum tilting of the scrap box near the end of its tilting stroke or movement, so as to effectively empty the material content of the box into the furnace (see FIGURE 11). The car or machine is provided with actuating mechanisms thereon that may be controlled by an operator on the car or, if desired, through a trolley and electrical connections and controls, at a remotely-positioned pulpit (not shown).

The installations or assembly is flexible in its utilization to meet various plant operating conditions and situations and/or emergency requirements. In this connection, each scrap box is provided with eyelet pairs 62 adjacent its opposite ends and extending upwardly therefrom which may be engaged by a bail frame unit, such as the unit 18 of our co-pending application No. 49,996 of August 16, 1960, entitled "Scrap Charging," so that each individual box may be raised out of its cradle and moved or lowered to a scrap-charging station or position. After the box is filled with scrap, it may be returned to a position on its cradle and locked with respect thereto. However, it will be apparent that, if desired, the scrap boxes may be filled in a conventional manner by a scrap bucket while still in position on the cradles of the car or machine.

Figure 13:
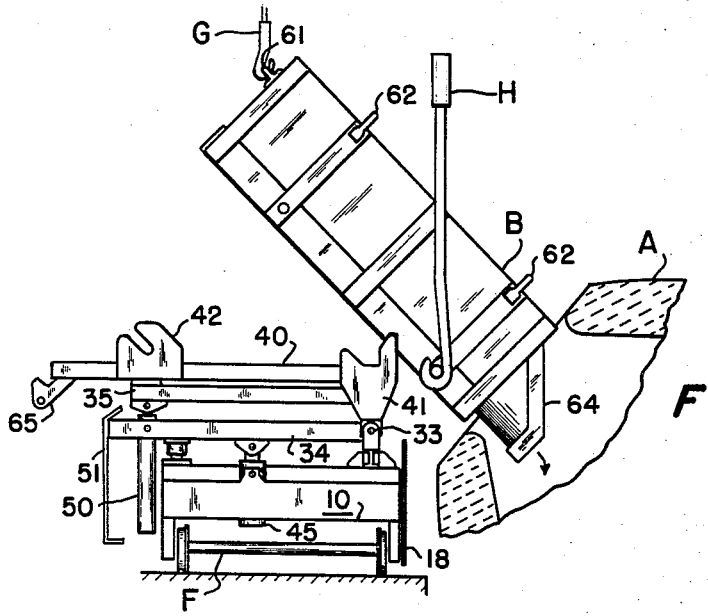

Although as shown particularly in FIGURES 10 and 11 of the drawings, we contemplate, first, directly tilting cradle frame 40 and its sub-frame 35 with respect to the swing frame 34, and then tilting the swing frame, it will be apparent that these two operations may be effected simultaneously or in the inverse order, if required or if desirable. Also, in the event of failure of the tilting mechanisms of the machine, each scrap box is adaptable for emergency tilting, either with the main cradle frame 40 about the machine frame by means of a lift hoist bail G engaging a back end portion thereof (see FIGURE 12), or about the hooks of a pair of hoist bails H engaging side trunnions at its front end, as shown in FIGURE 13. In the utilization of FIGURE 12, it will be noted that the cradle frame 40, itself, is tilted along with the scrap box, while in the utilization of FIGURE 13, the scrap box is tilted independently of and after having been removed or lifted away from its cradle.

Any desired timed operation of lift or operating motors 45 and 50 of FIGURE 14 of the drawings may be accomplished by employing auxiliary valves or conventional auxiliary timing devices in the flow lines which are employed as positive flow lines during the upward or tilting movement of the pistons of such motors.

Figure 2:
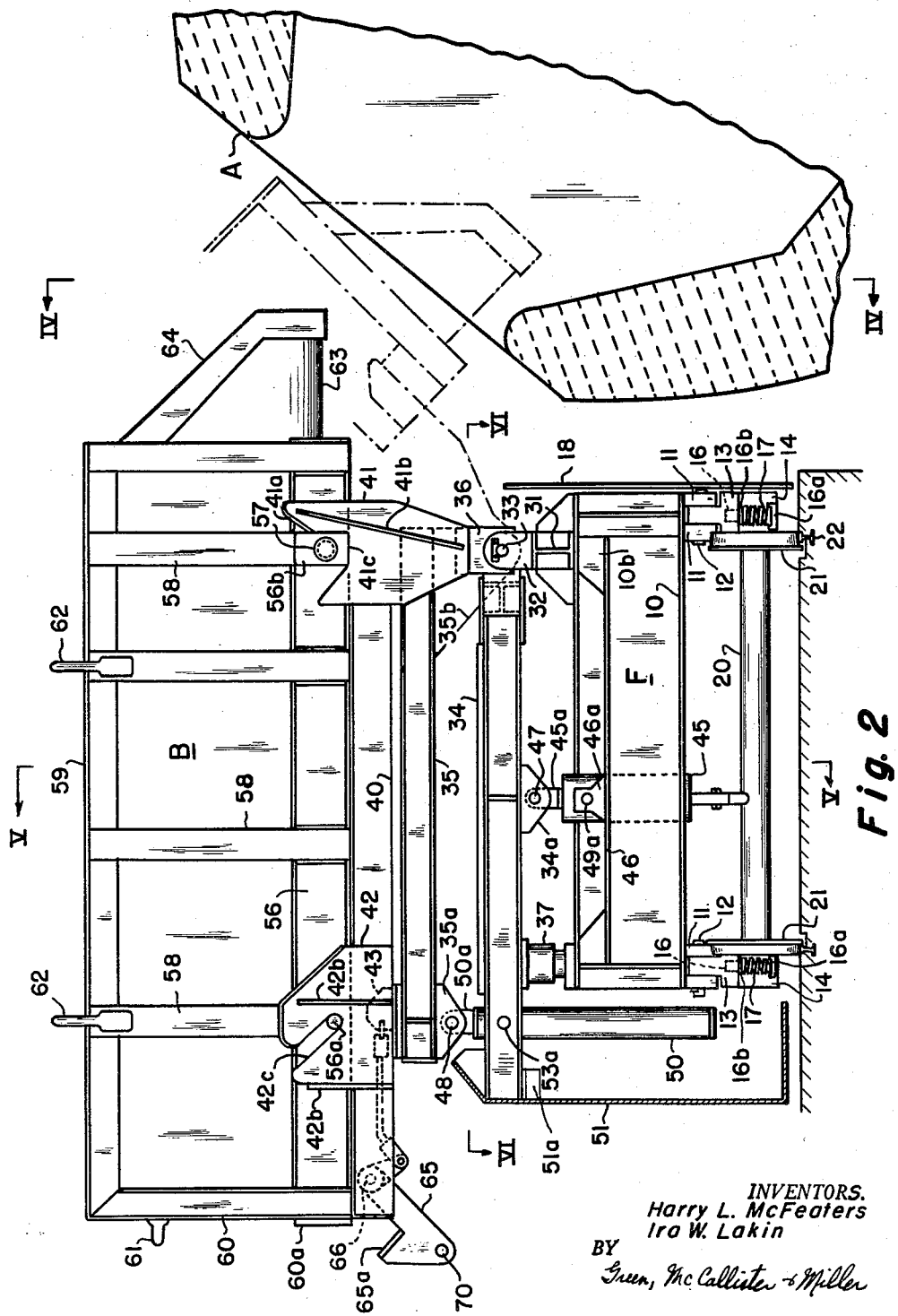

In the drawings, A represents the furnace or converter vessel that is to be charged with suitable materials, such as metal scrap (see particularly FIGURE 2). The machine, truck or car F which is adapted to move longitudinally along an elevated trackway provided by rails 22 has a frame or platform 10 that carries a pair of cross, laterally or transversely-positioned adjacent scrap boxes B and B'. Each of the scrap boxes is shown of the same construction and is provided with similar apparatus and mechanism for carrying and supporting it, for raising and lowering, etc. Thus, the description as to one box B or B' applies equally for the other box.

The platform 10 of the car or truck F, at its one end (see particularly FIGURES 1, 3 and 14) has a backwardly-extending, downwardly-offset portion 10a that carries an electric motor and fluid pump unit C, a four-way control valve unit D, and a fluid reservoir E. For lifting the scrap boxes B and B' from and positioning them on support structure of the car F, we have shown bails G and H of an overhead crane or suitable overhead hoists. As shown in FIGURES 12 and 13 and as before mentioned, the bails G and H may also be employed as emergency means in effecting the delivery of scrap from either or both of the boxes B and B'. The bail G may be employed to actuate a latch-release mechanism 65, etc. (see also FIGURES 8 and 9), as well as to lift the back end of a particular scrap box, while a pair of bails H may be employed to lift the front end of the box and serve as a front pivot about which the box may be tilted in an emergency.

The unit of our invention has means which retains the scrap boxes in an aligned relation thereon and which is employed to tilt them upwardly thereon to deliver scrap material to the open mouth portion of a furnace. The tilting mechanism or apparatus which is carried by the car F is shown as of a fluid or hydraulic-operated type which, as previously mentioned, may provide a higher velocity towards the final tilted position of each associated scrap box, so as to enable the box to better complete its final delivery of the remaining portion of its scrap material.

With particular reference to FIGURES 3 and 7, the car F has transversely-aligned and spaced-apart pairs of downwardly-projecting end brackets 11 which carry end trucks or carriages 13 through the agency of a cross shaft 12 which extends through each transversely-aligned pair of brackets 11 and centrally-pivotally mounts the end truck carriages 13. Each truck carriage 13 at its front and back ends has side flanges 13a which carry end bearing mountings 14 by means of suspended nut and bolt assemblies 15. It will be noted that the mountings 14 have upward, substantially rectangular portions that are slidably mounted to project downwardly from an associated end of an associated carriage 13 and have widened bottom portions to receive lower ends of resilient coil springs 17.

With further reference to FIGURE 2, mounting pins 16 are shown secured at their upper ends to project downwardly from each end of each carriage frame 13 to receive an upper end of an associated resilient means or heavy coil spring 17. The lower end of each spring 17 is secured to a bottom positioning piece 16a which is secured on a wing portion of the bearing mounting 14. At its upper end, the spring 17 is limited by and secured to the associated pin 16 by a cross pin 16b. It will be noted that the construction is such that each mounting 14 is resiliently carried by the springs 17 with respect to an associated carriage truck 13.

Also with reference to FIGURE 2, a vertical heat shield 18 is shown secured to the side of a car frame 10 which lies adjacent the furnace A and projects upwardly from the car platform 10. The shield 18 extends as a side apron to protect the car F when it is positioned adjacent the furnace A.

Each pair of bearing mountings 14 (see FIGURE 3) journals opposite ends of a pair of axle shafts 20 or 20'. Each shaft operatively carries a pair of flanged track wheels 21 adjacent its opposite ends. At least the wheels of the shaft 20' which is a drive shaft are keyed or secured thereto. With particular reference to FIGURE 3, we have shown an electric drive motor 25 that is connected through speed reducers 26 and gear trains 27 to actuate a drive pinion 28 that is keyed or feathered centrally to the drive shaft 20' of each pair of truck carriages 13.

A swing platform 29 positions the motor 25, the speed reducers 26 and the mounting for the gear train 27 and has a forwardly-projecting split sleeve bearing collar portion 29a which is rotatably mounted on an intermediate portion of an associated drive shaft 20' by means of bolt and nut assemblies 29b. A suspension rod 30 is, at its upper end, secured by a nut 30b to project downwardly from a slide mounting carried by the extension frame 10a and is, at its lower end, secured by a pivot connection 30a to a backwardly-projecting end of the swing platform 29. A resilient means or heavy coil spring 30c is positioned on the rod 30 to, at its upper end, abut the underside of the slide mounting on the extension platform 10a, and to, at its lower end, abut a cross pin 30d which is carried by the suspension rod, so as to resiliently, slidably position the upper end of the rod with respect to the extension platform 10a. As a result, the suspension platform 29 is permitted to swing in a resilient manner with the axle shaft 20' and its transversely-aligned and spaced pair of bearing mountings 14 (see also FIGURE 7).

A fixed frame structure 10b (see FIGURES 2 and 4) extends upwardly from the platform 10 of the car F and carries a fixed-position, longitudinally-extending swing or hinge-supporting, side frame 31 (see also FIGURE 3) of I-beam construction along its furnace side for each of the scrap box mounting frame structures. As shown particularly in FIGURES 4 and 6, each supporting side frame 31 has a centrally bolted-on, bifurcated or yoke mounting 31a consisting of a base and a pair of upwardly-projecting ears. A cross-extending pivot pin 38 extends through the ears of the yoke mounting 31a and pivotally or swingably mounts a pair of downwardly-projecting pivot arms 35b which project downwardly from a front end of sub-cradle frame 35.

Pairs of pivot mounting ears or lugs 32 are secured to opposite ends of the support frame 31 to project upwardly therefrom and rotatably carry cross-extending pivot studs 33 (see FIGURES 2, 3, 4 and 6). The studs 33 project as trunnions from opposite sides of the front end of swing frame 34 and swingably or pivotally mount lower ends of a pair of swing arms 36 that project downwardly from bifurcated arm portions 40b of main cradle or scrap-box-receiving cradle frame 40. It will be thus noted that the frames 34, 35 and 40 are all pivotally or swingably mounted at their front or furnace ends on the support frame 31, and that the main cradle frame 40 and the swing frame 34 are carried on the same pivot axis, while the sub-cradle frame 35 is carried on a second pivot axis adjacent and parallel to the first-mentioned pivot axis.

The swing frame 34, as shown particularly in FIGURES 2, and 5, has a pair of downwardly-projecting mount lugs 34a positioned intermediate its longitudinal extent and centrally of its transverse extent which carry a pivot pin 47 for connecting it to an end lug 45a of the piston shaft of a secondary fluid motor 45, so that the frame 34 may be raised to and lowered from its upper position, as indicated in FIGURE 11. The motor 45 may have about a 16 inch diameter fluid cylinder.

An upwardly-projecting bumper 37 is carried by the car frame 10b to position the back end portion of the swing frame 34 when it is in its down, substantially horizontal position of FIGURE 2. The housing or cylinder of the motor 45 is mounted between stands 46 that are carried by the platform frame 10b (see FIGURE 5) and have bearing mounts 46a to pivotally receive opposed stud ends 49a of a split-sleeve or collar mounting 49. The mounting 49 is shown clamped about the housing of the motor 45.

A primary fluid motor 50 (see FIGURES 2 and 3) has a split-sleeve collar 53 clamped thereon that carries a pair of stud ends 53a which are journaled within bearing mounts 52 that are secured on the swing frame 34. This provides the motor 50 with a pivoted or swing mounting on the swing frame 34. The motor 50 may have about a 14 inch diameter fluid cylinder. The piston rod of the motor 50 at its end carries a lug 50a which is pivotally connected by a pivot pin 48 (see FIGURE 5) within a pair of downwardly-projecting mounting lugs or ears 35a at the back end of the sub-cradle frame 35. As shown in FIGURE 3, the motor 50 carries a slip-sleeve mounting 54 for supporting fluid line g or g'. As shown in FIGURE 10, the motor 50 may be employed as an initial means for raising an associated scrap box to an intermediate or preliminary tilted relationship with respect to the mouth fo the furnace A, while the motor 40 of shorter stroke and quicker action may be employed to effect an accelerated final tilting action through the agency of the swing frame 34 that carries the motor 50. It will be noted that motor 50 operates through the agency of the sub-cradle frame 35, and that the motor 45 operates through the agency of the swing frame 34 and the connection provided between it and the sub-cradle frame 35 by the piston rod of the motor 50.

The main box cradle 40 (see FIGURES 2 and 4) is positioned above the sub-cradle frame 35 and has a front pair of guide-positioning wings or brackets 41 along opposite sides thereof to lie along opposite sides of the front end of the scrap box B or B'. The box cradle 40 (as shown particularly in FIGURE 5) is of I-beam construction and carries a bottom plate member 40a. The brackets 41 have (as shown particularly in FIGURE 4) downwardly, transversely-inwardly-projecting and converging portions to the bottom plate member 40a, have reinforcing side rib portions 41b, and upwardly-projecting slotted or bifurcated portions 41a (see FIGURE 2). The bifurcated portions 41a have upwardly-open, side-block or trunnion-receiving and positioning portions 41c. As shown, side or trunnion blocks 56b of somewhat rectangular shape project from opposite reinforcing side structure 56 of each scrap box and are normally adapted to be moved into and held into an aligned positioning within the slots 41c.

At its back end portion, the cradle 40 is provided with a pair of upwardly-projecting side-positioning wings or brackets 42 which, as shown in FIGURES 2 and 3, transversely-inwardly downwardly-converge with respect to the bottom plate 40a. Each back wing or bracket 42 has a backwardly-upwardly-open slotted portion 42c (see FIGURE 2) to receive outwardly-projecting, positioning trunnion studs 56a that are secured to opposite sides of the back end portion of the side structure 56 of the scrap box. The wings 42 are shown provided with back and side reinforcing and strengthening ribs 42b.

As shown particularly in FIGURES 2, 8 and 9, a latch 43 projects upwardly from the sub-cradle frame 35 and has a backwardly-open latching or locking slot 43a. A latch-release member 65 is secured by a pivot pin 66 to a side of the back end portion of the main cradle frame 40. The latch-release member 65 has a crank portion 65b that is pivotally connected by a pin 67 to a bifurcated back end portion 68a of an operating arm or rod 68. The rod 68 has a bifurcated front end portion 68b that is connected by a pin 69a to a latch or catch element 69 that is adapted to be moved into and out of engagement with the slot 43a of latch 43. The latch-release member 65 has a stepped portion which carries a wear plate 65a that is adapted to engage or abut against a wear plate 60a carried by a back-end closure plate structure 60 of the scrap box. As shown in FIGURE 8, when the member 65 is in its outwardly-downwardly pivoted position, the scrap box supporting main cradle frame 40 is locked or latched to the sub-cradle frame 35.

To unlock it or release the latch from the position of FIGURE 8 to the position of FIGURE 9, the outer end of the member 65 carries a hoist-receiving pin 70 which may, for example, be engaged by the hook of a bail G to raise it to the position of FIGURE 9, at which time, the back end portion of the cradle frame 40 is released with respect to the sub-cradle frame 35, see also FIGURE 12.

As shown particularly in FIGURE 5, each scrap box B and B' has an inner, smooth plate construction 55 of rounded shape to receive scrap material therein, its back end is closed-off by the vertical plate 60 (see FIGURE 2), and its front end is open and has a rounded extension nose portion 63. The reinforcing structure 56 of the scrap box carries the stud projections 56a, the blocks 56b, and lifting lugs 57 which extend from the blocks 56b (see particularly FIGURES 2 and 4). Its vertical reinforcing members 58 carry bail-hook-receiving eyelets 61 and 62. The lugs 57 may, as shown in FIGURES 4 and 13, be engaged by a pair of hooks or crane bails H when, in an emergency, a scrap box B or B' is to be tilted without the use of the tilting mechanism provided by the car unit. In this connection, it will be suspended at its rear end by a hoist bail G which has been moved into engagement with its back eyelet 61. The vertical reinforcing structure 58 of the scrap box is shown provided with side-positioned eyelet pairs 62 adjacent its front and back end portions, so that the box may be lifted by bails in a horizontal position from a scrap-receiving station to a carried position of one of the scrap box cradles 40 of the unit.

Figure 1:
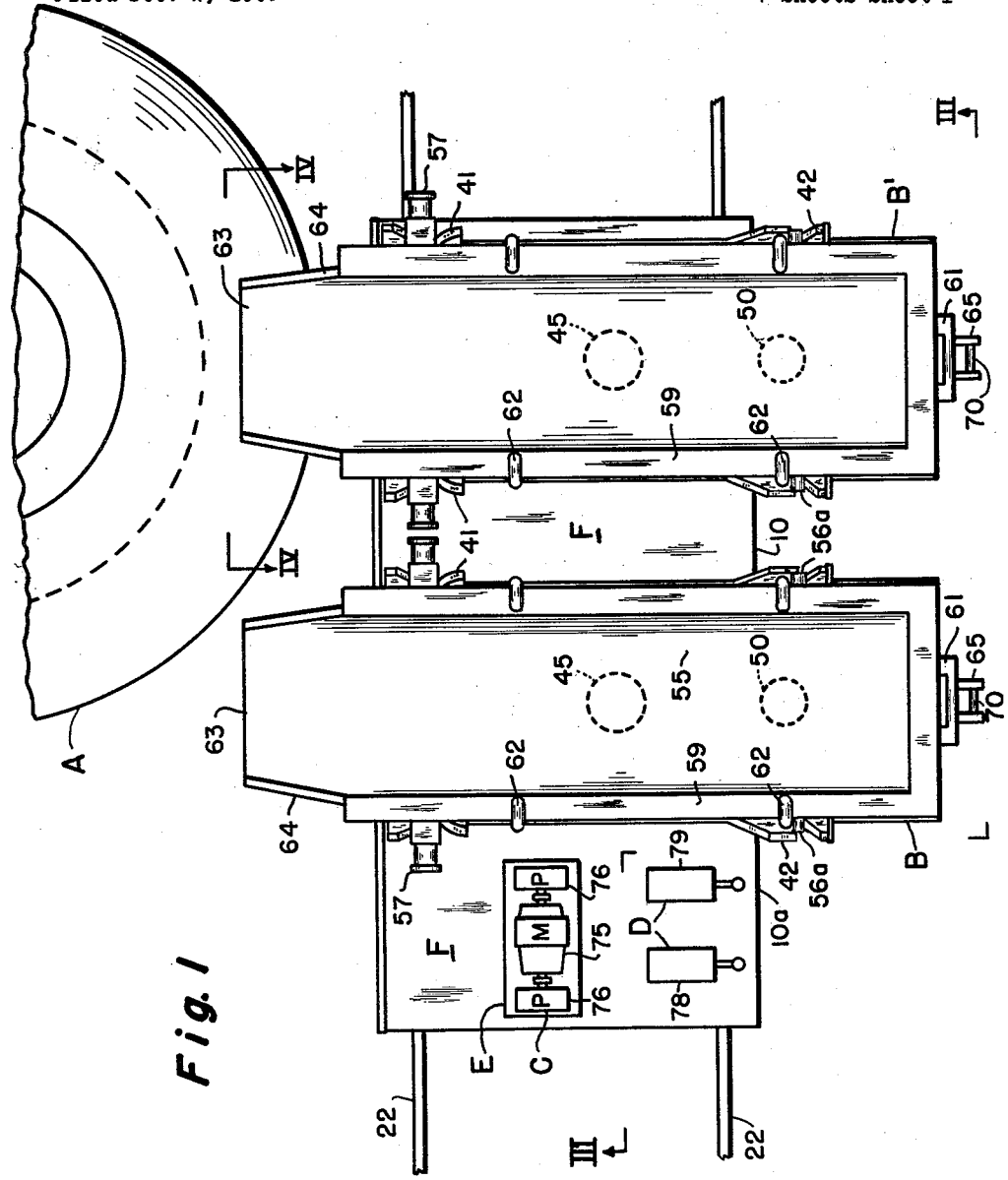

As shown in FIGURES 1 and 2, the front extension portion 63 of each scrap box B and B' defines a feed chute which is reinforced at 64 and is fully open at its front end as a curved extension of the curved inside plate 55.

In FIGURE 14, we have illustrated a system for operating the fluid motors 40 and 50 for each of the scrap boxes B and B'. As to unit C, an electric motor 75 is shown for driving a pair of side-positioned fluid pumps 76, for example of a hydraulic type, for withdrawing fluid from the reservoir E and forcing it under positive pressure through a line $b$ into one four-way valve 78 of the unit or group D. The valve 78 has a cross fluid connection $c$ to a second four-way valve 79 and has a line $d'$ for positive flow of fluid from the input line $b$ when the motors 45 and 50 are to be actuated forwardly to tilt the scrap box B'. At this time, the fluid line $i'$ constitutes a return flow line. On the other hand, when the pistons of the motors 45 and 50 are to be moved downwardly so as to lower the scrap box B', the line $i'$ becomes a positive fluid line, and the line $d'$ becomes a return fluid line. The corresponding lines $d$ and $i$ of the valve 79 function in the same manner as to the scrap box B. Return flow from the valve unit D to the reservoir is effected by line $k$ leading from the valve 79.

The lines $d$ and $d'$, as shown in FIGURE 14, are connected through swing joints 80, lines $g$ and $g'$, and swing joints 83 to the lower ends of the cylinders of the primary motors 50. The upper ends of the cylinders of the motors 50 are connected through lines $j$ and $j'$, swing joints 84 and 85, and lines $i$ or $i'$ to the respective valves 78 and 79. The lines $d$ and $d'$ are also connected through swing joints 81 to the lower ends of the cylinders of the fluid motors 45 for moving them upwardly; the upper or opposing ends of their cylinders are connected by swing joints 82, and lines $h$ and $h'$ to the lines $i$ and $i'$.

Summarized briefly, the valve 78 is adapted to be moved: (1) to a fully closed position as to its connecting lines $b$, $d'$ and $i'$, (2) to an open position as to lines $d'$ and $i'$ for energizing upward power strokes of the motors 45 and 50 for the box B', so as to provide a positive flow of fluid through the line $d'$ and a return flow from the line $i'$, as well as a return flow from the valve 78, through line $c$ and valve 79, and return line $k$ to the reservoir E, (3) to an open position providing a return stroke for the motors 45 and 50 of box B' by causing a positive flow of fluid along the line $i'$ and a return flow along the line $d'$, along line $c$, and through valve 79 to line $k$, and (4) to a closed position as to lines $d'$ and $i'$, but open from line $b$ to line $c$ to the valve 79, so that the scrap box B may be tilted and lowered. The valve 79 has the following positions: (1) fully closed as to its lines $c$, $d$, $k$ and $i$, (2) open to provide an upward power stroke to the motors 45 and 50 for the scrap box B by a positive flow through the lines $b$ and $c$ to the line $d$ and a return flow along the line $i$, (3) to provide a return stroke of the motors 45 and 50 by a positive fluid flow through the line $i$ and a return flow through the line $d$, and (4) closed as to lines $d$ and $i$, but open from line $c$ to line $k$ to permit operation of the valve 78 and the motors for the scrap box B'.

What we claim is:

1. A material handling installation for charging a furnace having an open mouth portion with scrap material wherein a charging machine is operatively positioned behind the furnace for movement into a charging position with respect to the furnace which comprises, a platform frame carried by the machine, a swing frame positioned above said platform frame and having pivot means at a front end thereof swingably connecting it with respect to a furnace side of said platform frame, a cradle frame positioned above said swing frame and having pivot means swingably connecting its front end portion with respect to the furnace side of said platform frame, a scrap box having a delivery end portion facing towards the furnace, cooperating means between said scrap box and said cradle frame for removably positioning said scrap box thereon, actuating means connected between said swing frame and said cradle frame and between said swing frame and said platform frame for raising and lowering said cradle frame about its pivot means to tilt said scrap box into and out of a scrap-delivering position with respect to the open mouth portion of the furnace, said actuating means having a first means for charging scrap from said scrap box initially tilting said cradle frame with respect to said swing frame and having a second means for completing the scrap charging from said scrap box by further tilting said swing frame with respect to said platform frame and at an accelerated rate.

2. A material handling installation as defined in claim 1 wherein, said first means has means for effecting a relatively long stroke of movement of said cradle frame with respect to said swing frame, and said second means has means for effecting a relatively short stroke of movement between said platform frame and said swing frame.

3. A material handling installation as defined in claim 1 wherein said cooperating means comprises, forwardly and backwardly mounted trunnion means carried by said scrap box, forwardly and backwardly mounted positioning means carried by said cradle frame for respectively receiving said forwardly and backwardly mounted trunnion means to position said scrap box on said cradle, said forwardly mounted positioning means having substantially vertically-open slotted portions to permit said forwardly mounted trunnions to be lifted upwardly out of retaining engagement therewith, and said backwardly mounted positioning means having forwardly-downwardly inclined slotted portions to tiltably retain said backwardly mounted trunnions therein when a forward end of said scrap box is raised to lift said forwardly mounted trunnions out of retaining engagement with the slotted portions of said forwardly mounted positioning means.

4. A material handling installation as defined in claim 1 wherein, cooperating latching means is provided between said swing frame and said cradle frame for, when desired, positively retaining said swing frame in a securely connected non-swingable relationship with respect to said cradle frame.

5. A material handling installation for charging a furnace having an open mouth portion with the scrap material wherein a charging machine is operatively positioned behind the furnace for movement into a charging position with respect to the furnace which comprises, a swing frame carried by the machine and having pivot means at a front end thereof swingably connecting it with respect to a furnace side of the machine, a cradle frame positioned above said swing frame and having pivot means swingably connecting its front end portion with respect to the furnace side of the machine, a scrap box having a delivery end portion facing towards the furnace, a front pair of trunnions projecting from opposite sides of said scrap box and a back pair of trunnions projecting from opposite sides of said scrap box, a front and back pair of positioning wings carried by said cradle frame for respectively receiving said front and back pair of trunnions therein, each of said front pair of wings having a forwardly-downwardly-sloped guide edge and having an open-top slotted portion extending from the bottom of said guide edge to upwardly-removably-receive said front pair of trunnions therein, said back pair of wings having forwardly-downwardly-inclining closed-bottom slotted portions for receiving said back pair of trunnions therein, and means on said scrap box adjacent its front end portion for lifting it upwardly to raise said front pair of trunnions out of a retaining position within the slotted portions of said front pair of wings and tilt said scrap box about and retain said back pair of trunnions within the slotted portions of said back pair of wings.

6. A scrap handling installation for an open mouth portion of a furnace wherein a charging machine is operatively positioned behind the furnace for movement into and out of a cooperating position with respect to the furnace which comprises, a cradle frame having pivot means swingably mounting its front end portion with respect to the furnace side of the machine, a scrap box having a delivery end portion facing forwardly towards the furnace, a front pair of projecting portions on opposite sides of said scrap box adjacent the delivery end portion thereof and a back pair of trunnions projecting from opposite sides of said scrap box, a front and back pair of positioning wings carried by said cradle frame for respectively receiving said front pair of projecting portions and said back pair of trunnions therein, said back pair of wings each having a backwardly-open and a forwardly-downwardly-declining closed-bottom slotted portion for receiving said back pair of trunnions therein, so that said back pair of trunnions can only be moved out of position within said back pair of wings by moving said scrap box backwardly-upwardly out of said slotted portions, said front pair of wings each having a front upwardly-projecting finger portion and a back downwardly-offset slot portion that is fully open vertically-upwardly, said finger portions having substantially vertical back edges to engage with and position said front projecting portions in abutment within said slot portions, the construction of said front pair of wings being such that said front pair of projecting portions may be lowered substantially vertically-downwardly into and lifted substantially vertically-upwardly out of position within said front pair of wings and said back pair of trunnions will pivotally support said scrap box within said back pair of wings when a front end portion of said scrap box is lifted to raise said front pair of projecting portions out of position within said front pair of wings.

7. A scrap handling installation for an open mouth of a tiltable furnace which comprises, an elevated trackway positioned on a longitudinal plane in a spaced relation above the furnace and substantially parallel to a longitudinal plane through a vertical axis of the furnace; a charging car operatively mounted for movement along said trackway into and out of a transversely-cooperating relation with the furnace, a group of transversely-extending charging units mounted in a longitudinally-spaced relation on said charging car for alternate movement into transverse alignment with the open mouth of a furnace when said charging car is moved along said trackway; each of said charging units having: a scrap box provided with forwardly and backwardly mounted trunnion means, a cradle frame for receiving said scrap box and provided with forwardly and backwardly mounted positioning means for respectively receiving said forwardly and backwardly mounted trunnion means, said forwardly mounted positioning means being constructed to permit said forwardly mounted trunnion to be lifted upwardly out of retaining engagement therewith, said backwardly mounted positioning means being constructed to tiltably retain said backwardly mounted trunnion means therein when a forward end of said scrap box is raised to lift said forwardly mounted trunnion means out of retaining engagement with said forwardly mounted positioning means; and means associated with each of said charging units for tilting its said scrap box to discharge scrap material into the furnace when each of said units is in a transversely-aligned relation with the open mouth thereof.

8. A scrap handling installation as defined in claim 7 wherein, said tilting means for each of said charging units has means for initially tilting its said scrap box at a slower rate of movement and for finally tilting its said scrap box towards the end of the scrap charging operation at a faster rate of movement.

9. A scrap handling installation for an open mouth portion of a furnace wherein a charging machine is operatively positioned for movement into and out of transverse alignment with the furnace which comprises, a platform frame carried by the machine, a swing frame operatively positioned on said platform frame and having pivot means at a front end portion thereof swingably connecting it with respect to a furnace side of said platform frame, a cradle frame operatively positioned on said swing frame and having pivot means swingably connecting its front end portion with respect to the furnace side of said platform frame, a scrap box having a delivery end portion facing toward the furnace, cooperating means between said scrap box and said cradle frame for removably-positioning said scrap box thereon, actuating means operatively connected between a back end portion of said swing frame and said cradle frame and between an intermediate portion of said platform frame and said swing frame for raising and lowering said cradle frame about its said pivot means and said swing frame about its said pivot means to tilt said scrap box into and out of a scrap-delivering position with respect to the open mouth portion of the furnace, and said actuating means being constructed to effect a relatively long stroke of movement of said cradle frame with respect to said swing frame and to effect a relatively short stroke of movement between said platform frame and said swing frame during the tilting of said scrap box into and out of a scrap delivering position with respect to the open mouth portion of the furnace.

References Cited in the file of this patent

UNITED STATES PATENTS

| | | |
|---|---|---|
| 620,256 | Short | Feb. 28, 1899 |
| 1,691,579 | Melcher | Nov. 13, 1928 |
| 1,786,560 | Burrows et al. | Dec. 30, 1930 |
| 2,143,934 | Burner | Jan. 17, 1939 |
| 2,792,602 | Rossi | May 21, 1957 |
| 2,836,309 | McFeaters | May 27, 1958 |
| 2,962,174 | Shekels | Nov. 29, 1960 |
| 2,963,185 | Jones et al. | Dec. 6, 1960 |